(12) United States Patent
Manukian et al.

(10) Patent No.: US 6,581,833 B2
(45) Date of Patent: Jun. 24, 2003

(54) SMART ENERGY EMITTING HEAD

(75) Inventors: Gagik Manukian, Chelmsford, MA (US); Alvaro Kaplan, Newton, MA (US); Alfred Lee Ellis, Arlington, MA (US)

(73) Assignee: GSI Lumonics, Inc., Billerica, MA (US)

( * ) Notice: Subject to any disclaimer, the term of this patent is extended or adjusted under 35 U.S.C. 154(b) by 0 days.

(21) Appl. No.: 09/985,464

(22) Filed: Nov. 2, 2001

(65) Prior Publication Data

US 2003/0085279 A1 May 8, 2003

(51) Int. Cl.[7] ................................. G06K 7/14
(52) U.S. Cl. ............ 235/454; 235/462.32; 235/462.33; 235/462.36; 235/454; 235/435
(58) Field of Search ................ 235/462.32, 462.33, 235/462.36, 454, 435, 472; 606/10, 11, 12

(56) References Cited

U.S. PATENT DOCUMENTS 5,719,385 A * 2/1998 Wike et al. ............ 235/462.09
5,838,884 A * 11/1998 AuYeung et al. ............. 358/1.7
6,283,372 B1 * 9/2001 Li .......................... 235/462.32
6,383,177 B1 * 5/2002 Balle-Petersen et al. ....... 606/9
6,390,371 B1 * 5/2002 Armga et al. .......... 235/472.01
6,435,413 B1 * 8/2002 Kumagai et al. ...... 235/462.45

* cited by examiner

*Primary Examiner*—Karl D. Frech
*Assistant Examiner*—Kim Nguyen
(74) *Attorney, Agent, or Firm*—Antonelli, Terry, Stout & Kraus, LLP

(57) ABSTRACT

An energy emitting system includes a housing with a controller, scanner and non-interruptible interface, having a bandwidth of at least 20 KHz and a latency of not more than 5 milliseconds, disposed therein. An interface port receives input at the housing. The controller issues command control signals, including trajectory control signals, corresponding to the received input. The non-interruptible interface interconnects the controller and the scanner, and communicates the issued trajectory control signals from the controller to the scanner. The scanner directs a continuous movement of energy simultaneously in two directions, in accordance with the communicated trajectory control signals.

27 Claims, 10 Drawing Sheets

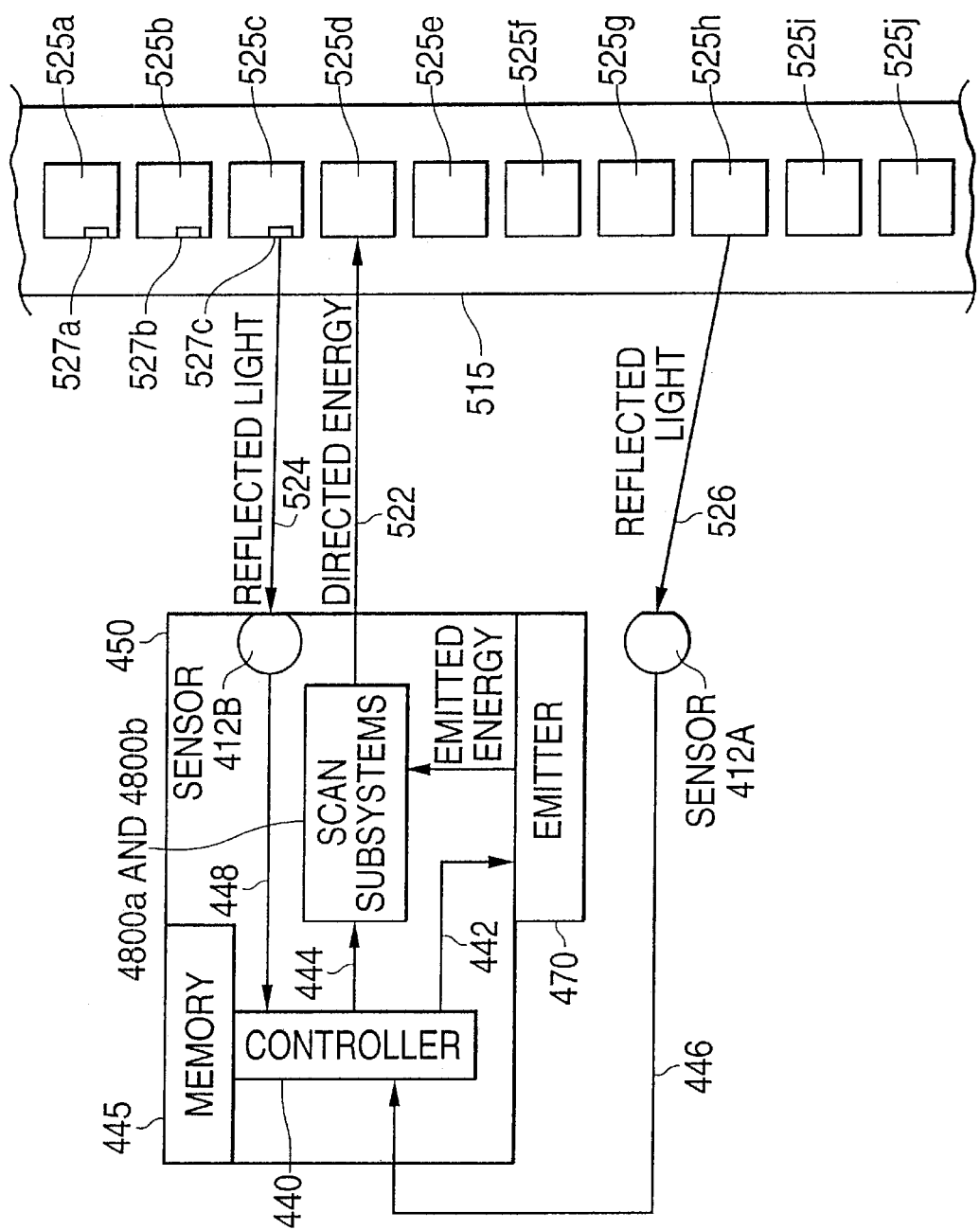

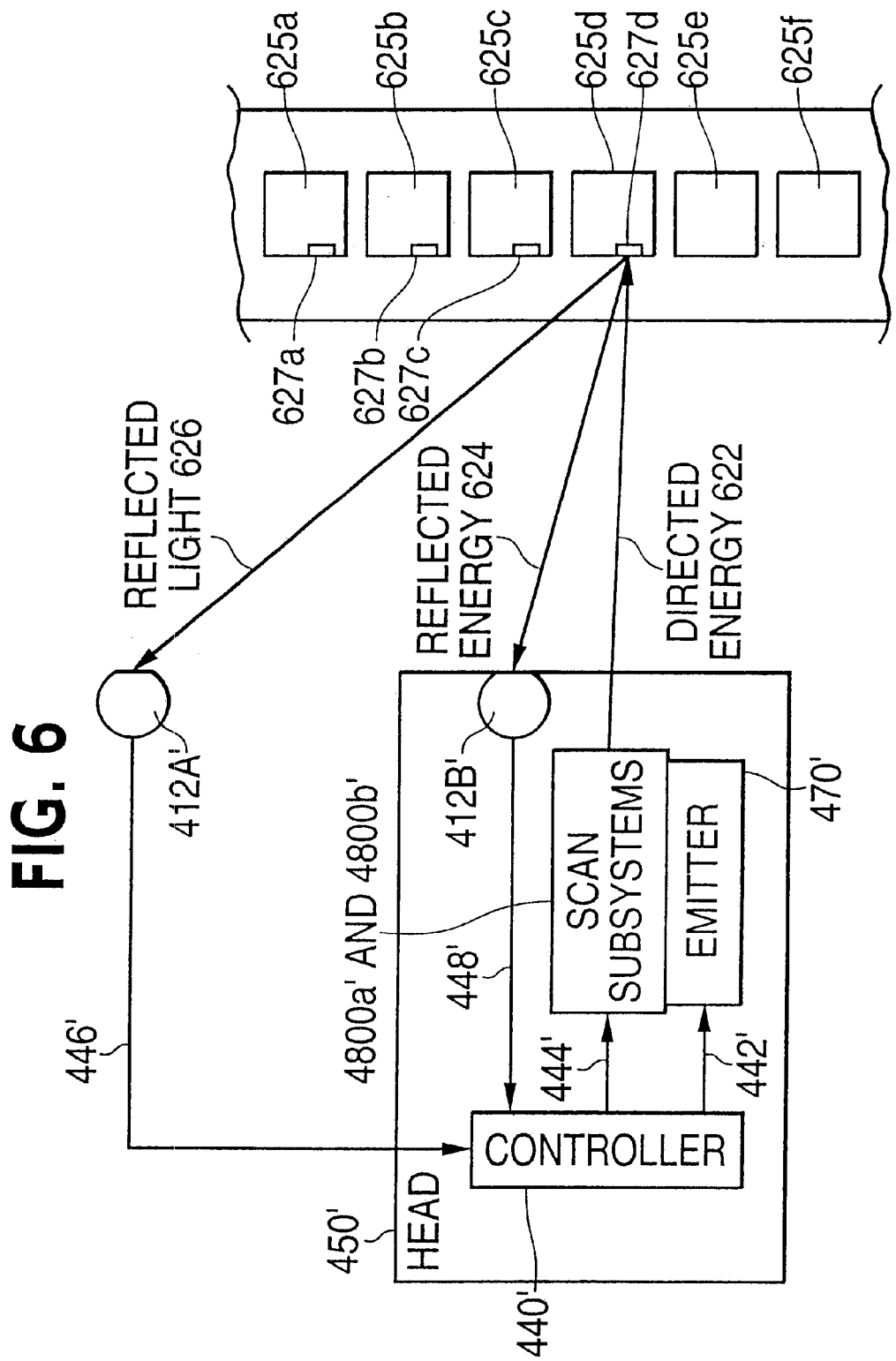

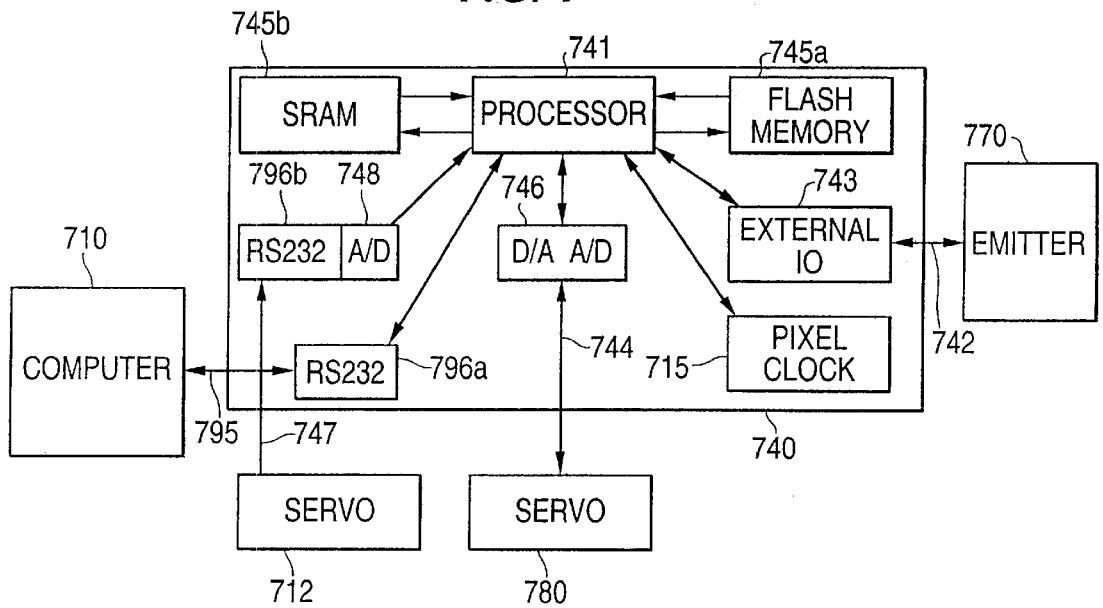
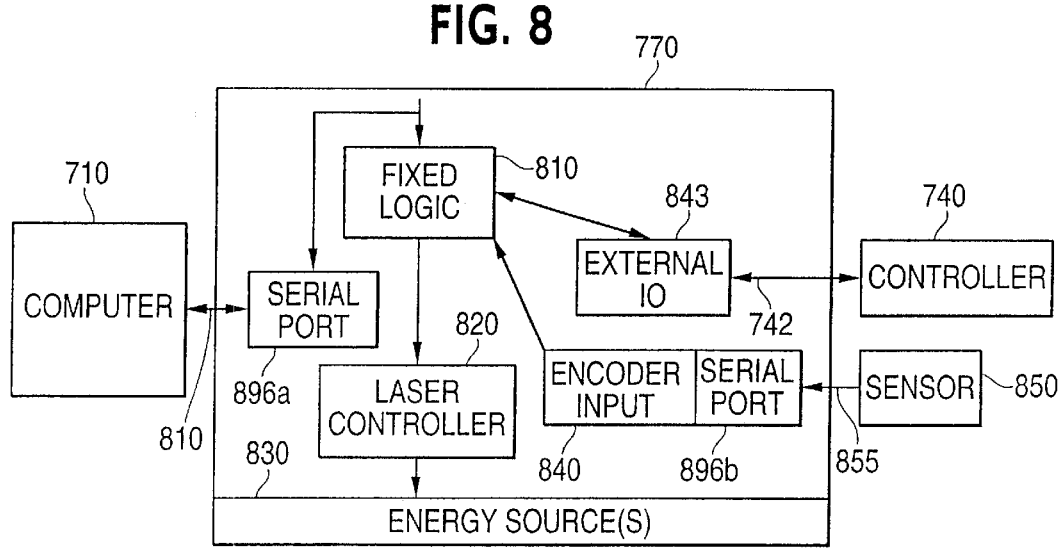

SMART ENERGY EMITTING HEAD

TECHNICAL FIELD

The present invention relates to optical or other energy directing systems and more particularly to an intelligent energy emitting head.

BACKGROUND

FIG. 1 is a simplified functional block diagram of a conventional two dimensional energy emitting system 100 which could, for example, be used for reading, writing, marking, drilling, welding or various other purposes. As shown, the system 100 includes a user interface and command signal generator 110 for entering user commands and generating command signals corresponding to the user commands. A command control generator 120 generates emitter control and trajectory control signals in accordance with the command signals.

An energy emitter 130 emits energy, for example in the form of a beam, in accordance with the emitter control signals, e.g. emitter off and emitter on signals over time. The emitter may be in the form of a gas laser, e.g. a CO2 laser, a solid state laser, e.g. a Yag or laser diode, a fiber optic laser, or any other type energy emitter, including an x-ray, acoustic, e.g. ultrasound, or microwave emitter.

An X-scanner 140 directs the emitted energy in an X direction and a Y-scanner 150 directs the emitted energy in a Y direction, in accordance with the trajectory control signals, e.g. positions for the emitted energy, such as at X-grid positions and Y-grid positions, over time, on a plane 160.

It will be recognized that the trajectory control signals may correspond to any parameter(s) necessary for the directed energy to accomplish the desired task. For example, if the user commands entered using the user interface 110 designate or correspond to a desired character font type for product marking, the command control generator 120 generates the control signals by translating the font type commands into emitter and trajectory control signals corresponding thereto.

The processing performed by the command control generator 120 may be complex. More particularly, to move the mirrors in the scanners, which will be described further below, in a manner that ensures that the emitted energy is directed to very precise location settings, forms straight rather than curved lines, and/or has other desirable features, the command control generator 120 must perform concise coordinate transformations which anticipate and remove errors and anomalies from the motion of the emitted energy and guide the emitted energy so as to properly perform the desired task, such as writing an A, B, or C in a way that is acceptable for the job. These coordinate transformations are sometimes referred to as grid calibrations or corrections. As will be recognized by those skilled in the art, algorithms are commonly utilized by the command control generator 120 in performing such coordinate transformations.

By properly controlling the trajectory of the X and Y-scanners, in synchronization with the emitting of energy from the emitter 130, the emitted energy can be directed at a desired location, e.g. a point or area, anywhere on an x-y coordinate plane 160 or along a desired path anywhere within the x-y coordinate plane 160. It will be recognized that the emitted energy might actually pass through the x-y coordinate plane 160 and impinge upon something on the other side of the plane, for example to illuminate an item, if so desired.

As shown in FIG. 2, a conventional commercially packaged two-dimensional energy emitting system 200, includes a computer 210, typically a personal computer (PC), which functions as the user interface 110 of FIG. 1. The computer 210 includes a processor 220 programmed using off-the-shelf software and/or specialized software, or corresponding logic in another form, to initially process user commands entered on a standard keyboard, mouse or other user input device 230, and to optionally process other inputs as will be discussed further below. A controller 240, which functions as the command control generator 120 of FIG. 1, processes the output from the processor 220 to generate command control signals, i.e. the emitter and trajectory control signals.

As also shown in FIG. 2, the system 200 includes an energy emitting head 250 which includes a receiver 260 for receiving the command control signals. An energy emitter 270 may or may not be attached to the head 250. The head 250 and energy emitter 270 are often manufactured by different manufacturers and most typically the emitter 270 is not attached, but rather remains separated from the head 250. In any event the emitter 270 functions as the energy emitter 130 of FIG. 1.

The head 250 includes a servo 280a/galvo 285a/mirror 290a subsystem which functions as the X-scanner 140 of FIG. 1, and a servo 280b/galvo 285b/mirror 290b subsystem which functions as the Y-scanner 150 of FIG. 1. These subsystems operate in synchronization with the emitter 270 according to the received command control signals to direct the energy emitted from the emitter 270 to a desired location (s), as is well understood in the art.

For example, the synchronized operation of the energy emitter 270, servo 280a/galvo 285a/mirror 290a subsystem, and servo 280b/galvo 285b/mirror 290b subsystem, in accordance with the received command control signals might result in a label on a stationary box, or one moving on a conveyor, being read for inventory or other purposes, a label being written on a stationary box, or one moving on a conveyor, to identify a shipping destination or some other information, a weld being made on a stationary device, or one moving on a conveyor, to manufacture a product, a parameter of a stationary device, or one moving on a conveyor, being sensed for quality control or other purposes, or some other desired action.

In the system 200, the computer 210 and energy emitting head 250 are interconnected by a high bandwidth communications interface 295. The command control signals generated by the controller 240 are communicated to the receiver 260 via the interface 295. As is well understood in the art, the interface 295 between the computer 210 and head 250 must be noise protected. This is because, if the interface 295 is insufficiently protected, noise could seriously interfere with communications between the computer 210 and head 250 in practical industrial implementations, and result in the improper operation of the head. The interface 295, is commonly implemented using an XY100 interface, which was originally developed by the predecessor of the assignee of all rights in the present application for its GMAX™ product line. Typically, the interface can be used to interconnect the computer with various different types of heads. Thus, although FIG. 2 depicts a particular head 250 being interconnected to computer 210 via interface 295, it will be recognized that any type of head designed to interconnect via interface 295 could be substituted for head 250 and commanded by the computer 210. However, because a high bandwidth interface is conventionally required, standard PCs that will be used to control energy emitting heads must be modified to accommodate the required interface.

To summarize, in conventional energy emitting systems all commanding is performed by the computer, i.e. outside of the head, and the head simply operates in accordance with the received command control signals. Thus, all intelligence resides in the computer. Accordingly, the computer receives user commands for a task to be performed, such as marking a product as it moves down an assembly line, via the user interface 230. The user commands are processed by the processor 220 to transform the task command into operational parameters. The output of the processor is then translated and formatted by the controller 240 to generate the command control signals that correspond to the operational parameters and can be understood by the head. The head receiver 260 receives the command control signals via the high bandwidth interface 295, and forwards these commands to the emitter 270 and servo/galvo/mirror subsystems 280–290 to direct the synchronized emitting of energy from the emitter and movement of the mirrors by the scan subsystems, causing energy to impinge on or pass through a plane at a desired location and thereby accomplish the desired task.

There are various problems with conventional systems of the type describe above. One problem is that, because a high bandwidth interface is required between the user-input device and the scan head, conventional PC's must be modified for use with conventional scan heads. Another problem is that the need to input to and process data at a computer and then transmit command control signals from the computer to the head necessarily results in delays in the operation of the-scan head responsive to the receive input. Accordingly, in conventional systems there is an inherent latency between the inputting of commands and the performance of the desired writing operations by the scan head.

Further, because of this inherent latency, conventional scan system have been unable to obtain effective real time modification of the scan head operations. This, in turn, results in such systems being incapable of performing or efficiently performing certain desired functions. Additionally, because various factors may affect the operation of the energy emitter and servo/galvo/mirror subsystems, the inability to modify system operations in real time may result in poor system performance in certain practical implementations. Additionally, because of the limited functionality of conventional scan heads, conventional systems often have difficulty performing synchronized operations, such as those requiring multiple different actions to be performed in a desired order.

OBJECTIONS OF THE INVENTION

Accordingly, it is an object of the present invention to provide an energy directing head which overcomes the aforementioned problems.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with the present invention, a system for directing energy includes a housing, often referred to as the head housing, having a controller, scanner and non-interruptible interface disposed therein. The non-interruptible interface preferably has a relatively high bandwidth of at least 20 KHz and a relatively low latency of no more than 5 milliseconds. An input interface port, typically a relatively low bandwidth port, such as an RS232 serial port, receives an input at the housing. Typically, the input is communicated to the interface port via a relatively low bandwidth, high latency, interruptible interface. The input may, for example, be a user command, data output from a sensor, clock signal, or some other type of input. If the received input is from a sensor, that sensor could be disposed either within the housing or external to the housing.

The controller issues command control signals, which include trajectory control signals, corresponding to the received input. The command control signals may be generated at the controller. If so, such signals may be generated in real time, or at some earlier point in time and then retrieved from storage and issued as, for example, part of the initialization process for a then current job.

The non-interruptible interface interconnects the controller and the scanner, and communicates the issued trajectory control signals from the controller to the scanner. The scanner directs a continuous movement of the energy in two directions simultaneously, in accordance with the communicated trajectory control signals. If the system is operating in real time, the time lapse, i.e. latency, between receipt of the input and directing the energy in accordance with the communicated trajectory control signals is preferably held to less than one millisecond.

According to other aspects of the invention, the system may include an emitter which emits the energy directed by the scanner, and the command control signals issued by the controller could also include emitter control signals corresponding to the received input. An emitter interface, which could be of either low or high bandwidth, interconnects the controller and the emitter, and communicates the issued emitter control signals from the controller to the emitter. The emitter then emits the energy in accordance with the communicated emitter control signals.

Preferably, the emitter includes one or more light sources, e.g. a laser light generator or an optical fiber, and the scanner includes one or more deflector, e.g. mirror(s) or lens(es). If the light source is a laser light generator, it generates the emitted energy, e.g. a laser light beam, in accordance with the communicated emitter control signals. The deflector directs the energy emitted from the light source in accordance with the communicated trajectory control signals, for example by movement of a mirror or lens.

Advantageously, the scanner further includes one or more servos and one or more galvos. If so, the non-interruptible interface interconnects the controller to the servo(s). The servo(s) generate drive signals in accordance with the communicated trajectory control signals, and the galvo(s) move the deflector(s) in accordance with the generated drive signals.

According to still further aspects of the invention, the system may include a memory disposed within the housing. The memory could, for example, be optical, electrical or magnetic, and could take any desired form, including hard, floppy or compact disk, random access memory or some other form. Beneficially, the memory may be used to store a trajectory control algorithm, which are well known in the art. If so, the controller can retrieve the stored trajectory control algorithm from memory and apply the retrieved algorithm to generate the command control signals corresponding to the received input. As discussed above, the generated command control signals may be issued promptly after generation, i.e. in real time, or at some later time. Additionally or alternatively, the memory may be used to store the command control signals themselves. For example, command control signals could be pre-generated by the controller based on an input and then stored in the memory, or received by the controller as a batch input, i.e. a non-real time communication, and stored. In either case, the stored command control signals can be retrieved by the controller and the retrieved signals issued responsive to the receipt of another input. This other input may be received in a real time communication, and could, for example, represent a user command, sensed parameter, clock signal or other input. Such a user command might direct initiation of a job, while such a sensed parameter might be indicative of the need to initiate a job or to modify system operations.

According to still further aspects of the invention, a sensor disposed within the housing operates to detect a parameter, e.g. a label on or quality related parameter of a part being moved on a conveyor, and to generate a sensor signal corresponding to the detected parameter. Another interface, which could be of either low or high bandwidth, interconnects the sensor and the controller, and communicates the generated sensor signal from the sensor to the controller. The controller issues other command control signals, including other trajectory control signals, corresponding to the communicated sensor signal. These other issued signals are communicated via the non-interruptible interface from the controller to the scanner. The scanner then directs energy in accordance with the communicated other trajectory control signals. It will be recognized that such other signals may also include other emitter control signals corresponding to the communicated sensor signal. If so, the interface interconnecting the controller and the emitter communicates these other emitter control signals from the controller to the emitter. The emitter then emits the energy in accordance with the latter communicated emitter control signals.

In one particularly advantageous implementation of the invention, a multi-mode energy emitting system is provided. The multi-mode system includes a housing, e.g. a head housing having a controller and scanner disposed therein. The controller operates to issue first command control signals in a first mode operation based on a first type input, e.g. a user command, and second command control signals in a second mode of operation based on a second type input, e.g. a different user command, sensed parameter or clock signal. An emitter, which is typically housed in a separate housing which is removably attached to the aforementioned controller/scanner housing, emits energy having a first power, e.g. a write beam, responsive to the first command control signals and emits energy having a second power, different than the first power, e.g. a different power write beam or a read beam, responsive to the second command control signals. The scanner directs the emitted energy having the first power in accordance with the first command control signals, and the emitted energy having the second power in accordance with the second command control signals.

The multi-mode system scanner beneficially includes one or more servos, galvos and deflectors. The servo(s) generate first drive signals in accordance with the first command control signals, which are communicated to the servo(s) via a non-interruptible interface, and second drive signals in accordance with the second command control signals, which are also communicated to the servo(s) via the non-interruptible interface. The galvo(s) position the deflector(s) in a first position in accordance with the generated first drive signals, and position the deflector(s) in a second position in accordance with the generated second drive signals.

According to other aspects of the invention, the multi-mode system housing is a portable housing, and the emitter is disposed within the portable housing. In this regard, the portable housing may be formed by removably attaching a head housing, having the controller and scanner disposed therein, to an emitter housing, having the emitter disposed therein. It should also be understood that a portable housing is one which can be carried by a single human being from location to location, with the system components, including the controller, scanner and emitter, housed therein. Preferably, a carrier, such as a shoulder strap, is attached to the portable housing and usable by an individual to carry the housing to a desired location.

BRIEF DESCRIPTION OF DRAWINGS

FIG. 5 depicts an exemplary implementation of the present invention.

FIG. 6 depicts another exemplary implementation of the present invention.

FIG. 7 is a somewhat simplified exemplary depiction of primary components of the controller shown in FIGS. 3–6.

FIG. 8 is a somewhat simplified exemplary depiction of primary components of the emitter shown in FIG. 7.

BEST MODE FOR CARRYING OUT THE INVENTION

Figure 3:
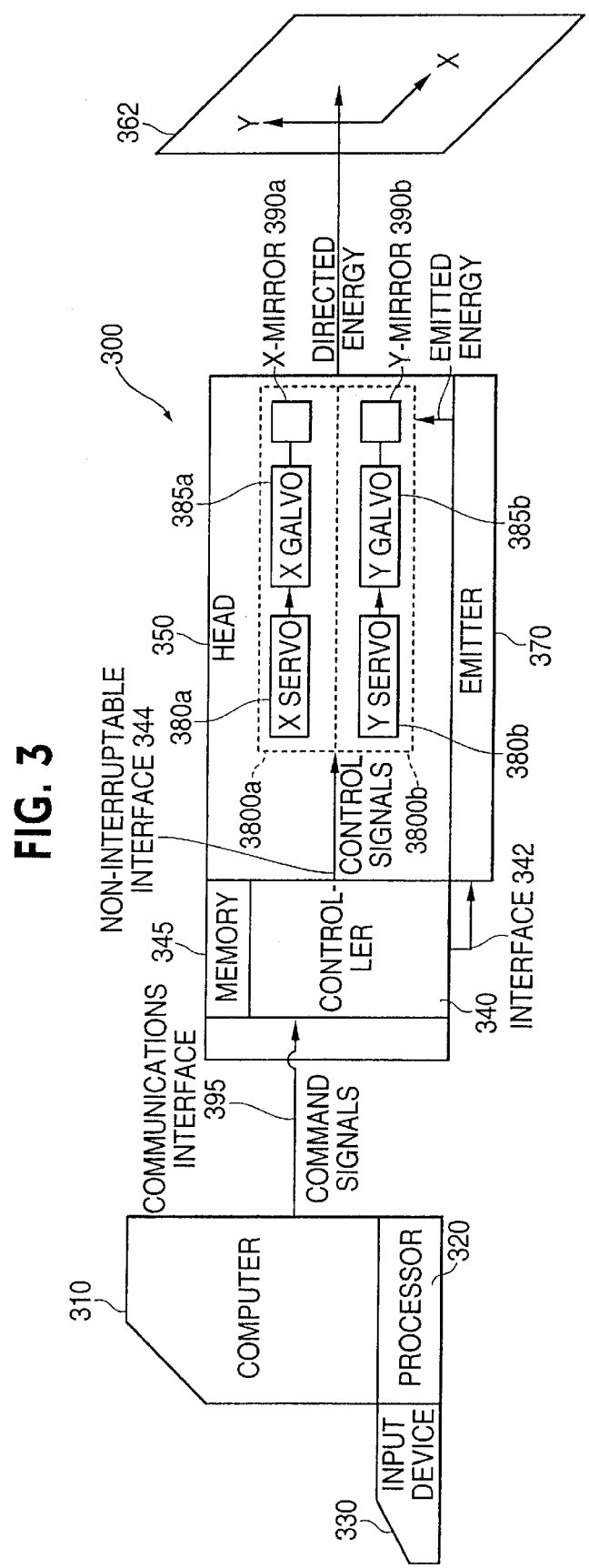
FIG. 3 depicts a first embodiment of a two-dimensional energy emitting system in accordance with the present invention.

FIG. 3 depicts a two-dimensional energy emitting system 300 in accordance with the present invention. The system 300 includes a computer 310, typically a personal computer (PC), which receives user inputs. The user inputs serve as user commands and typically direct a task to be performed. The user commands may also designate job related parameters, such as a font to be used in marking a product or any other desired parameter.

The computer 310 includes a processor 320 configured, i.e. programmed, using off-the-shelf and/or specialized software, or corresponding logic in another form, to initially process user commands entered on a standard keyboard, mouse or other user input device 330. The processed user commands output from the processor 320 are transmitted from the computer using a communication interface 395. According to the present invention, the interface 395 can be a low bandwidth, high latency, interruptible interface, such as a standard RS232 serial interface which operates at 115 KB. Low bandwidth means a bandwidth less than 20 KHz, and high latency means a latency of over 5 milliseconds. By interruptible it is meant that communications over the interface may be interrupted by devices (not shown) controlling the interface 395, such as a communications network controller, or the device transmitting the user commands, such as the computer 310. However, a higher bandwidth interface may be used if so desired. The bandwidth of interface 395 is preferably in the range of 115 KB to 10 MB.

As also shown in FIG. 3, the system 300 includes an energy directing head housing 350 which has a controller 340 for receiving the transmitted user commands via the interface 395. The controller 340 is configured to process the received commands and issue command control signals, including emitter and trajectory control signals, corresponding thereto. The controller 340 is preferably programmed to perform the functions described herein using specialized software stored at the controller memory 345, or corresponding logic in another form.

The emitter control signals may, for example, direct that the energy be emitted in a particular form, e.g. as a beam, and at particular points in time, e.g. at a particular periodicity. The trajectory control signals direct the continuous movement, simultaneously in two directions, or the placement of the emitted beam in, for example, an x-y plane 362 at particular points in space, in synchronization with the periodicity of the modulation of the emitted beam.

The controller 340 will preferably ensure that the energy is directed to very precise desired x-y location settings, form straight rather than curved lines and make geometric corrections in various geometric shapes of characters, and/or has other desirable features. To ensure that the directed energy has the desired features, the controller can be configured to perform concise coordinate transformations, sometimes referred to as grid calibrations or corrections, which anticipate and remove errors and anomalies from the motion or placement of the directed energy, and guide the directed energy, as is well understood in the art.

An energy emitter 370 emits energy in accordance with the emitter control signals. The energy emitter 370 is preferably contained in a separate housing which can be either attached to and detached from the head or kept completely separated from the head, thereby facilitating the use of different energy emitters with the same head. The emitter 370 may in the form of a gas laser, e.g. a CO2 laser, a solid state laser, e.g. a Yag or laser diode, a fiber optic laser, or other type energy emitter, including an x-ray, acoustic, e.g. ultrasound, or microwave emitter.

A servo 380a/galvo 385a/mirror 390a subsystem, which will sometimes be referred to as the X-scan subsystem 3800a, and the servo 380b/galvo 385b/mirror 390b subsystem, which will sometimes be referred to as the Y-scan subsystem 3800b, operate in synchronization with the modulations of emitter 370 according to the generated trajectory control signals to direct the energy emitted from the emitter 370 to a desired location(s).

It will be recognized that although the X and Y-scan subsystems 3800a and 3800b are depicted as separate independent subsystems, if desired, some or all of components of the depicted components of the respective subsystems could be implemented as a single component. For example, those skilled in the art will recognize that a single servo could function as both the X-servo 380a and Y-servo 380b or a single galvo could replace x-galvo 385a and y-galvo 385b.

By properly controlling the trajectory of the X and Y scan subsystems 3800a and 3800b, in synchronization with the emitting of energy from the emitter 370, the emitted energy can be directed at a desired location(s), e.g. a point or area, anywhere on the x-y coordinate plane 362 or along a desired path anywhere within the x-y coordinate plane 362. More particularly, the X-scan subsystem 3800a directs the emitted energy in an X direction and a Y-scan subsystem 3800b directs the emitted energy in a Y direction, simultaneously in accordance with the trajectory control signals. It will be recognized that the emitted energy might actually pass through the x-y coordinate plane 362 and be used to impinge upon something on the other side of the plane, if so desired.

In the system 300, the computer 310 and energy emitting head 350 are, as noted above, typically interconnected by a low bandwidth, high latency, interruptible interface 395, although a higher bandwidth, lower latency interface, such as an Ethernet interface, could be used, if desired, and the interface could be non-interruptible. The commands may be transmitted by the computer 310 to the head 350 via the interface 395 in real time or may be preloaded and stored in a controller memory 345.

The head controller 340 is interconnected to the emitter 370 via another interface 342. Interface 342 may be a low or high bandwidth interface, but should have low latency and be non-interruptible. The controller 340 is also connected to the servos 380a and 380b via a high bandwidth, low latency, non-interruptible interface 344. The bandwidth of interface 342 can be as low as 2400 baud, while the bandwidth of interface 344 will be at least 20 KHz and could be over 100 KHz. The command control signals generated by the controller 340 may be communicated to the emitter 370 and scan subsystems 3800a and 3800b in real time via the interfaces 342 and 344. The control signals may be prestored and then subsequently retrieved and transmitted in real time.

The interface 395 between the computer 310 and head 350 is preferably noise protected, although the need for noise protection is diminished as compared to that required in conventional systems because only the user commands, and not the command control signals, are communicated via this interface. The interface 344 may, if desired, be implemented using an XY100 interface. If so, the interface could be used to interconnect the controller 340 with various different types of scan subsystems. Hence, the scan subsystems may beneficially be removable from the head 350 and replaceable with other scan subsystems.

Figure 4:
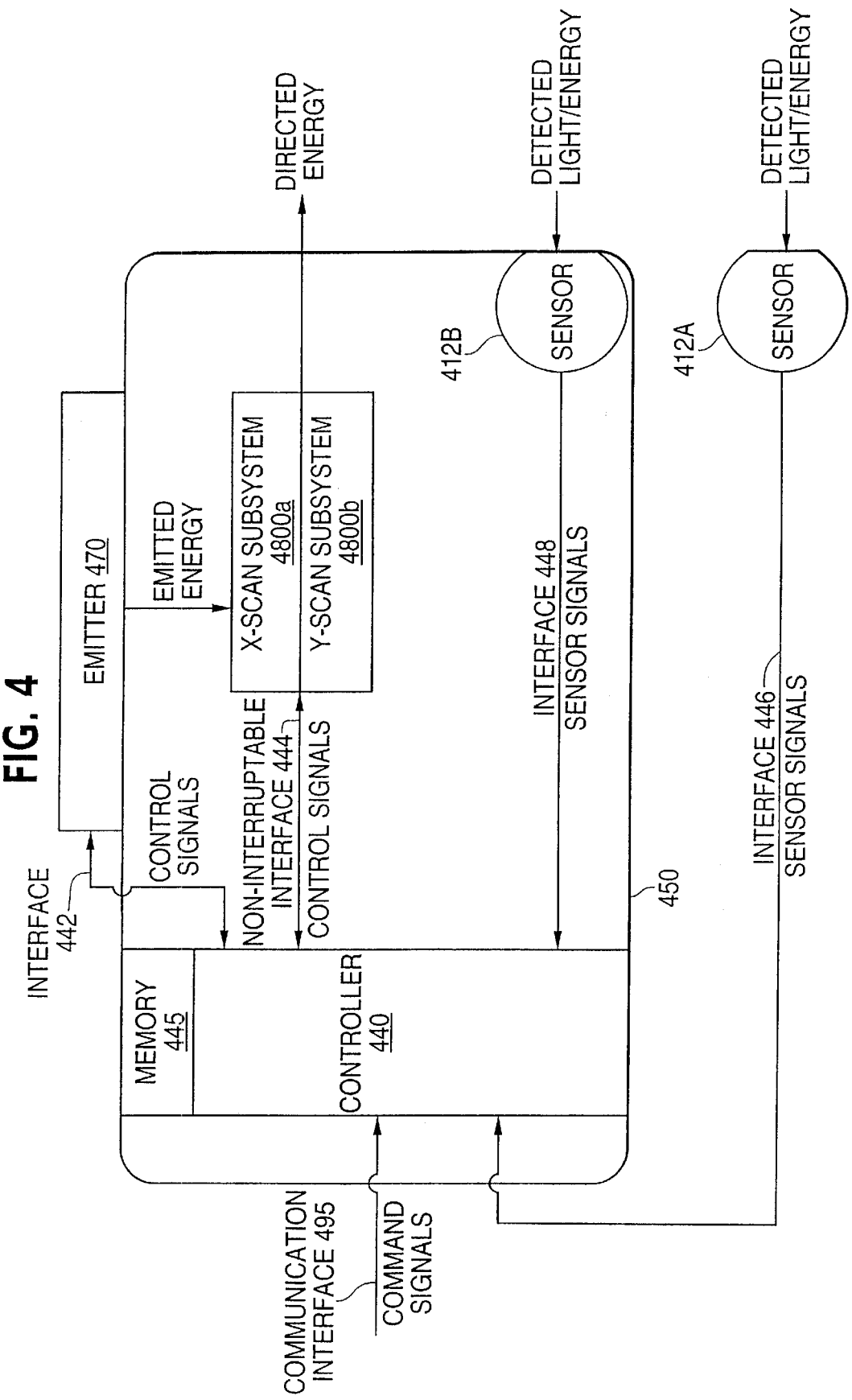
FIG. 4 depicts a second embodiment of a two-dimensional energy emitting system in accordance with the present invention.

As shown in FIG. 4, the head may also be provided with another interface. If so, the controller may also easily receive non-user inputs. For example, in the embodiment of the invention depicted in FIG. 4, the head housing 450 houses a controller 440 which receives both commands corresponding to user inputs via an interface 495, as well as sensor output signals from a sensor or other device 412a located outside the head via an interface 446 and/or a sensor or other device 412b located within the head via an interface 448. Depending on the implementation, the interfaces 446, 448, and/or 495, could be of either low or high bandwidth and have low or high latency. These interfaces may also be interruptible. For example, in certain networked or non-networked implementations, an RS232 or other lower bandwidth, higher latency interface may be used for one or more of these interfaces, while in certain other networked implementations, an Ethernet or other higher bandwidth, lower latency interface could be used.

In the embodiment of FIG. 4, the controller 440 could be further configured, i.e. programmed, to process inputs from the sensor(s) or other device(s) 412a and/or 412b to determine, for example, if the operation of the emitter 470 and scan subsystems 4800*a* and 4800*b* should be initiated or modified. Here again, if the controller 440 is configured using software, the software is stored on the controller memory 445.

In an exemplary implementation depicted in FIG. 5, products or product packaging 525*a*–525*j* moves along a conveyor 515. The head 450, including controller 440 and scan subassemblies 4800*a* and 4800*b*, directs an energy beam 522, emitted by emitter 470, to write a mark 527*a*–527*c* on the products or product packaging being conveyed past the head 450 on conveyor 515. The sensor 412B, within the head 450, detects reflected light 524 from the marks that have been written on the product or product packaging by the energy beam 522. The reflected light could, for example, be ambient light, or light from some other source (not shown), which is reflected off the applicable mark. As shown, the sensor 412B is sensing the mark 527*c* formed on product or product packaging 525*c*.

Signals representing the detected marks are output from the sensor 412B, and transmitted to the controller 440 via interface 448. These sensor signals are processed at the head 450 by the controller 440 to determine whether or not the quality of the applicable mark is acceptable. If not, modified command control signals may be issued by the controller 440 to the scan subassemblies 4800*a* and 4800*b* and/or emitter 470 to modify the directed energy beam 522 in real time. Thus, the quality of the marks subsequently formed on product or product packaging 525*d*–525*j* by the energy beam 522 as items are moved by the conveyor into view of the head 450, can be quickly improved.

As also shown in the exemplary implementation of FIG. 5, the command control signals may be modified in real time so that a product or product packaging is marked in one way if a sensed parameter, e.g. a tolerance, falls within a threshold and in another way, or not marked at all, if the sensed parameter falls outside the threshold. In the depicted implementation, the head 450 stores different quantity or quality markings, such as quantity or quality marking A and quantity or quality marking B, at memory 445. An external sensor 412A detects reflected light 526 representing a parameter of a product or product packaging 525*a*–525*j* corresponding to the quantity or quality of the applicable item as it is moved into view of the sensor 412A by the conveyor 515. Here again, the reflected light 526 could be ambient light, or light from some other source (not shown), which is reflected off the applicable item. As shown, the sensor 412A is sensing a parameter of the product or product packaging 525*h*.

Signals representing the sensed parameter(s) is output from the sensor 412A and transmitted to the controller 440 via interface 446. The signals are processed at the head 450 by the controller 440 to determine whether or not the sensed parameter corresponds to quality or quantity A or to quality or quantity B. Depending on this determination, the head controller 440 will issue the appropriate command control signals to the scan subsystems 4800*a* and 4800*b*, via interface 444, and/or emitter 470, via interface 442, to direct the light beam 522 to form a letter A or letter B on the applicable item, once it is moved by the conveyor 515 into view of the head 450.

It should be recognized that user commands, as well as marking information, such as quality or quantity markings A and B, a company name or emblem, or a date, to be marked on an item by the head 350 or 450, can be received as a set of information at the time the job is initiated and temporarily stored at the memory 345 or 445 during the job. Alternatively, such commands and/or information could be downloaded and stored at the memory 345 or 445 well before and/or be maintained in memory well after job initiation. In the former case, the applicable controller 340 or 440 need only retrieve the commands and/or information pre-stored at the memory when required.

Furthermore, the commands and/or information could be downloaded to and pre-processed by the applicable controller 340 or 440, so that the command control signals representing the downloaded information are pre-generated and stored in the memory 345 or 445. In such case, the controller 340 or 440 need only retrieve the command control signals for the emitter and scan subsystems already stored at the memory when required. Thus, the computer 410 and interface 495 may be disconnected from the head 350 or 450, and the head can perform all required tasks independently.

As described above, whether the sensor is internal or external to the head, the signals representing the sensed information is processed by the controller 440 to determine what, if any, modification to the command control signals is required. If the sensor is located outside the head, the signals are transmitted directly to the head. Accordingly, modification of command control signals, and thus to the location or path of the directed energy, can be performed easily and quickly, thereby providing effective real time adjustments in the placement of the energy emitted from the head.

It should be noted that a job could be initiated and performed without any input from a user. For example, the signals from an internal or external sensor could represent a write command, thereby potentially eliminating the need for a user input device, such as computer 410 of FIG. 4 altogether. Such sensor commanding might be used, for example, if the only required marking is a date either stored at the head memory or generated by the head controller. In such a case, the only input required to perform the job might be a signal from a sensor indicating that a product has been detected on a conveyor. Based on this signal, the head controller issues the necessary commands to the scan subsystems and emitter so that the product is marked with the applicable date, e.g. a current date. The controller may use a signal from an internal clock disposed within the head to synchronize the timing of the controls with the movement of the product to be marked by the conveyor, so that the writing is automatically performed when the product is at the appropriate position on the conveyor.

It should also be understood that, if desired, sensor signals could represent parameters that affect the operation of the energy emitter 470 and/or scan subsystems 4800*a* and 4800*b*, such as sensed ambient temperature and/or humidity. In implementations having this feature, the sensor signals are processed by the controller at the head to modify the command control signals as appropriate to adjust the operation of the emitter 470 and/or scan subsystems 4800*a* and 4800*b* during a job, in view of sensed parameters.

FIG. 6 depicts another exemplary implementation of the present invention. In this implementation, products or product packaging 625*a*–625*f* move along conveyor 615. The head 450' directs an energy beam 622 to write a mark 627*a*–627*d* on the products or product packaging being conveyed within the view of the head 450' on conveyor 615. A sensor 412A' external to the head 450' or a sensor 412B', within the head 450', detects reflected energy 624 or 626. The reflected energy 624 and 626 is the energy from the beam 622 directed from the scan head 450' and reflected off the item being marked. As shown, the sensor 412A' or 412B' senses the energy reflected off item 625*d* as it is being written with mark 627*d* by energy beam 622.

Signals representing the reflected energy 624 or 626 is output from the applicable sensor 412A' or 412B' to controller 440' via interface 446' or 448', as applicable. The signals are processed by controller 440' at the head 450' to determine whether or not the quality of the mark is acceptable. If not, modified command control signals are issued to the scan subassemblies 4800$a$' and 4800$b$' via interface 444' and/or emitter 470' via interface 442', to adjust the energy beam 622 in real time. Thus, the quality of the marks subsequently formed on product or product packaging 625$e$–625$f$ by the energy beam 622, as these items are moved by conveyor 615 into view of the head 450', can be quickly improved.

In addition to performing the functions described above, the controller 440' is also capable of controlling the emitter 470' such that the energy within the beam 622 can be varied. More particularly, the controller 440' is configured to issue instructions directing the emitter 470' to emit the beam 622 so as to have different levels of energy in different operational modes. It should be understood, that the emitter 470' can be implemented to include either a single energy source or multiple energy sources, which in either case can be controlled to provide a range of output powers. The different outputs could, if desired, be of different wavelengths and/or have different focuses, e.g. one output could be a narrow beam for writing on a target, while another could be a broad beam for illuminating a target. If different wavelengths are utilized, the higher energy beam could, for example, be an invisible infrared beam, and the lower energy beam might be a visible beam. If the wavelengths are different and multiple sources are included in the emitter 470', the low energy output beam can, if desired, be superimposed on the high energy output beam.

In an exemplary multimode implementation of the system shown in FIG. 6, in a first mode of operation the controller 440' controls the emitter 470' so that the emitted beam 622 is a lower energy beam, e.g. a non-writing beam. If the emitter includes only a single energy source, the command control signals to the emitter may, for example, control the power from a power source (not shown) to the emitter, such that a lower energy beam is emitted in the first mode of operation. If the emitter includes multiple light sources, the command control signals to the emitter control which source emits the beam in each mode of operation by, for example, controlling the activation and deactivation of each source as appropriate.

The lower energy beam is reflected off the applicable item, i.e. item 625$d$ as shown in FIG. 6, as reflected energy 624 or 626. The reflected energy 624 or 626 is detected by the sensor 412A' or 412B'. The detected light 624 or 626 could, for example, correspond to a parameter of the item 625$d$. As discussed above, the detected parameter could be associated with a quantity, quality or other parameter relevant to how the item 625$d$ should be marked.

The controller 440' processes the output signals from the sensor 412A' or 412B' and issues command control signals corresponding to the detected parameter, thereby directing the operation of the emitter and scan subassemblies in a second mode. In this second mode of operation, the controller 440' controls the emitter 470' so that the emitted energy beam 622 is a higher energy beam, e.g. a write beam. This higher energy beam is directed in accordance with the command control signals to write the appropriate mark on the applicable item, i.e. the mark 627$d$ on item 625$d$ as shown in FIG. 6.

If desired, once the writing has been completed, the controller 440' can be configured to further control the emitter to operate in a third mode of operation. In this mode, the command control signals from the controller 440' control the emitter 470' so that the emitted energy beam 622 is again a lower energy beam, e.g. another non-writing beam. This lower energy beam, which could have an energy level which is the same as or different than that of the beam emitted in the first mode of operation, is reflected off the applicable item, i.e. item 625$d$ as shown in FIG. 6, as reflected energy 626.

Signals representing the reflected energy 624 or 626 is output from the sensor 412A' or 412B' and processed at the head 450' by controller 440' to determine whether or not the quality of the mark 427$d$ made during the second mode of operation is acceptable. If not, modified command control signals are issued in real time and used to adjust the energy beam 622 during the next operation in the second mode. Thus, the quality of the marks subsequently formed by the beam 622 on product or product packaging 625$e$–625$f$, as these items are moved by the conveyor 615 into view of the head, can be quickly improved.

It will be recognized that the head 450' described above with reference to FIG. 6 can be easily adapted to operate only in the first and second or the second and third modes. Further, the sequence of operations can be varied, as may be desirable under the particular circumstances. For example, the energy levels may be varied to write on different types of materials, or to form different types of markings, or to perform different types of writing, e.g. metal welding, plastic welding, drilling, cutting or marking, or to perform different practical applications. Additionally, the same or different sensors could be utilized in different modes of operation.

FIG. 7 is a somewhat simplified exemplary depiction of primary components of a controller 740, which could be configured to serve as any of the controllers 340, 440 or 440'. As shown the controller 740 has memory, including flash memory storage 745$a$ and random access memory storage 745$b$, which is preferably an SRAM.

As discussed above, the memory stores the executable programmed instructions which determine the functionality of the controller, as well as inputs and/or other information utilized by the controller to issue the desired command control signals to the scan subsystem and energy emitter. The programming is typically stored at the flash memory storage 745$a$ on a permanent basis and at the random access memory storage 745$b$ during execution to drive the functioning of the controller 740.

User inputs are received from the computer 710 via interface 795 and a port 796$a$. Port 796$a$ is preferably an RS232 port, but could alternatively, and in some cases advantageously, be another type port, e.g. an Ethernet port. Sensor inputs are received from each of one or more internal or external sensor 712 via an interface 747 and port 796$b$. Interface port 796$b$ is also preferably an RS232 port, but could alternatively, and perhaps beneficially, be some other type port, such as an Ethernet port. If the sensor output is an analog signal, it is converted by the analog to digital (A/D) converter 748.

The inputs as well as other information, such as generated command control signals, may be temporarily stored at the random access memory storage 745$b$ during a job. However, if desired some or all of these inputs and information can be stored on a more permanent basis at the flash memory storage 745$a$. For example, pregenerated command control signals are advantageously stored at the flash memory storage 745$a$ until required, and retrieved from memory storage 745*a* for transmission to the servo(s) 780 and emitter 770 to initiate a job or during a job.

A processor 741 executes the programmed instructions to process the input(s) and other information, as discussed above, to generate the command control signals. For example, the inputs may include binary inputs to initiate a marking job from computer 710 or a sensor 712. A simplified exemplary scan controller program is as follows:

Createflashprogram 1 1% vector program run at system powerup, stored in flash memory;

Waitsync 1% waits for sync input 1 to go true;

Executepgm 'a' % runs program 'a';

Repeat;

End.

This program will cause the scan controller processor 740 to run program 'a' whenever it receives a signal from sync input 1. Program 'a' could be the date code, capable of outputting all the necessary servo(s) 780 and emitter 770 instructions, to direct a scan head to write a date at a specific location in the marking field on a target. The scan head is positioned on a production line, say for canned green beans. A sensor 712 detects the position of the cans of green beans as they move along a conveyor and sends a pulse to sync input 1 via interface 747 and port 796*b* whenever a can of green beans is at the proper position for marking. The scan head is then directed to mark the properly positioned can with the date code. The internal processor 741 may operate once a day, e.g. at the beginning of the morning shift, to update program 'a' to direct the writing of the new date. However, if desired, an external computer 710 could alternatively be used to update program 'a'.

As noted above, if the signals are pre-generated, the processor 741 beneficially directs the storage of these signals at the flash memory storage 745*a*. Otherwise, the generated signals are immediately converted by the digital to analog (D/A) converter 746 and directed to the servo(s) 780 via the high bandwidth interface 744, and to the emitter 770 via the external input/output (I/O) port 743 and the interface 742.

As shown in FIG. 7, the interfaces 742 and 744 between the processor 741 and the emitter 770 and servo(s) 780 are two-way interfaces which also allow information to be fed back to and processed by the processor 741 to confirm proper operation of the scan subsystem(s) having servo(s) 780 and emitter 770. A pixel clock is also provided for generating clock signals which are utilized in synchronizing the operations of the scan subsystem(s), emitter and controller, as is well understood by those skilled in the art.

Figure 1:
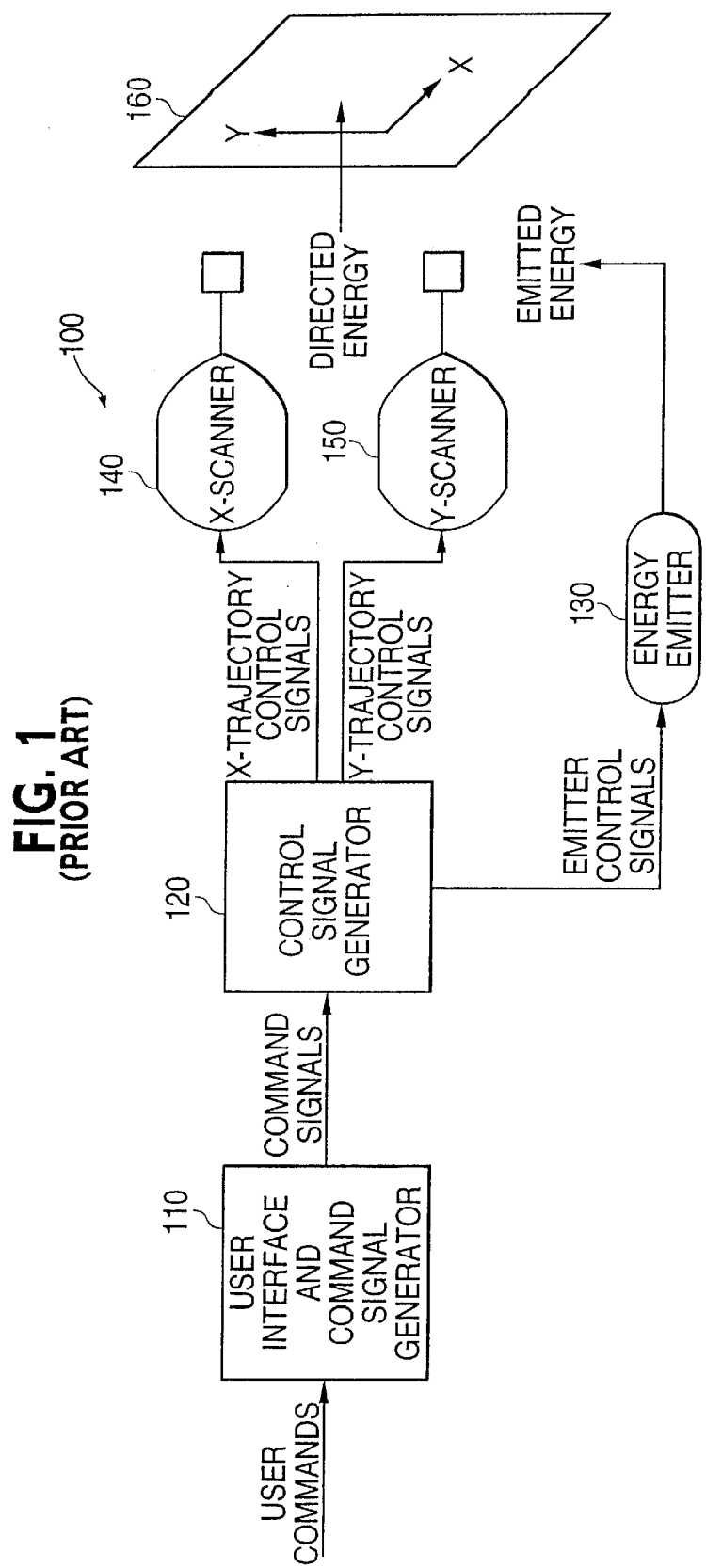
FIG. 1 is a simplified functional block diagram of a conventional two dimensional energy emitting system.
Figure 2:
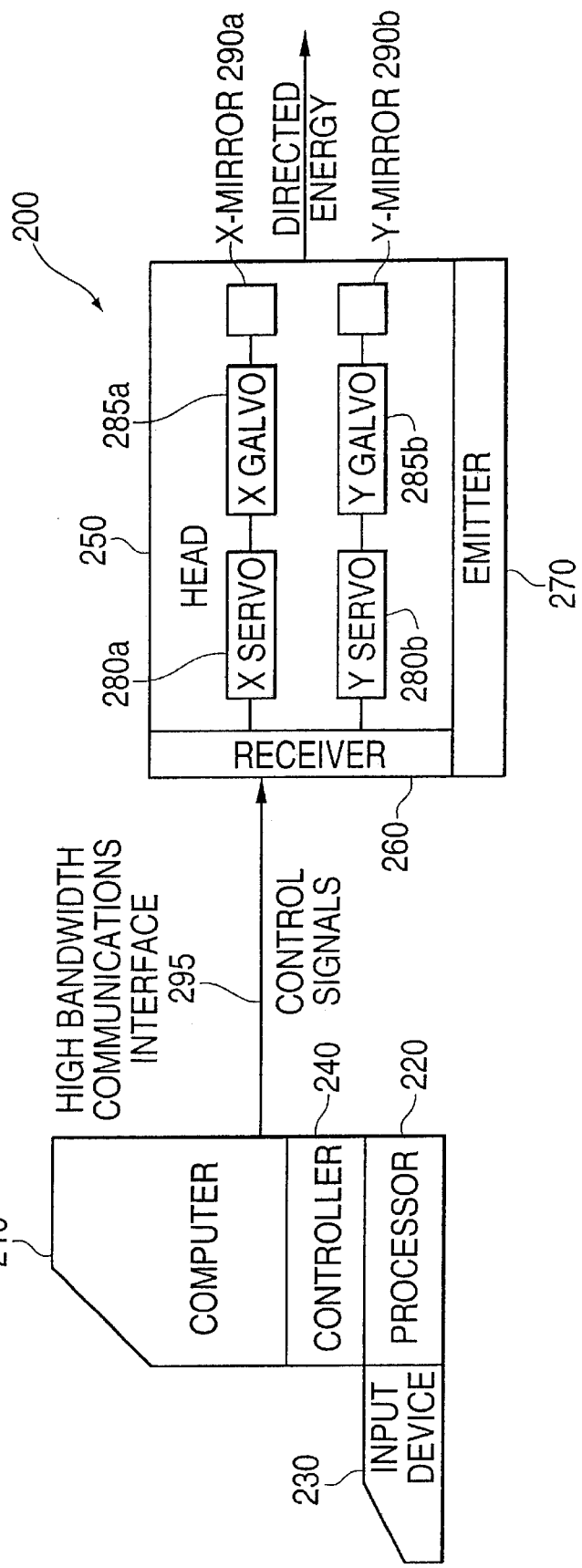
FIG. 2, depicts a typical implementation of the FIG. 1 system.

Using the above described invention, the latency in providing command control signals to the scan subsystem(s) and emitter can be reduced from the latency in conventional PC based systems such as that shown in FIG. 2, operating Windows 95™, from approximately 50 milliseconds, or operating Windows NT™, from over 5 milliseconds, to approximately 20 microseconds. Thus, the reduction in latency is on the order of a factor of 100 to 1000.

FIG. 8 is a somewhat simplified exemplary depiction of primary components of the emitter 770 of FIG. 7. The depicted emitter 770 could be configured to serve as any of the emitters 370, 470 or 470'. As shown the emitter 770 includes fixed logic 810, which determines the functionality of the emitter. The fixed logic drives the operation of the emitter based on command control signals from the controller 740, i.e. the emitter control signals and, if desired, inputs from a sensor 850, as will be discussed further below.

The logic may be input from a computer 710 to the emitter 770, via a preferably low bandwidth interface 810 and serial port 896*a*, which could also be an RS 232 port. Alternatively, the fixed logic could be pre-loaded during the manufacturing of the emitter 770. It will be recognized that if input from the computer 710, the logic, although characterized herein as fixed logic, could be change from time to time using non-real time transmissions of substitute logic. Typically, such substitute logic will be transmitted by a batch transmission.

Inputs are received by the emitter 770 from the controller 740 via interface 742 and I/O port 843 or from the computer 710 via interface 810 and port 896*a*. Inputs may, if desired, also be received from a sensor 850 via a preferably low bandwidth interface 855 and serial port 896*b*. Sensor inputs are encoded in input encoder 840.

The sensor 850 is different than the previously described sensors, in that it will typically sense a parameter(s) affecting only the operation of the emitter 770. For example, the sensor 850 could sense the conveyor 515 or 615 (described above) and output data representing the speed at which the conveyor is moving. Signals representing this data are received by the emitter 770 via the interface 855 and serial port 896*b*, and are transformed by the encoder 840 as is well understood in the art. The transformed signals are then utilized by the emitter logic 810 in controlling the timing of the emissions of energy from the energy source(s) 830.

The logic 810, in accordance with the emitter command control signals received from the controller 740 via interface 742 and, if applicable, the signals received from the sensor 850, directs the laser controller 820, which provides optical isolation as is well understood in the art. In accordance with the received directives, the laser controller drives the energy source(s) 830, as has been previously described.

Figure 9:
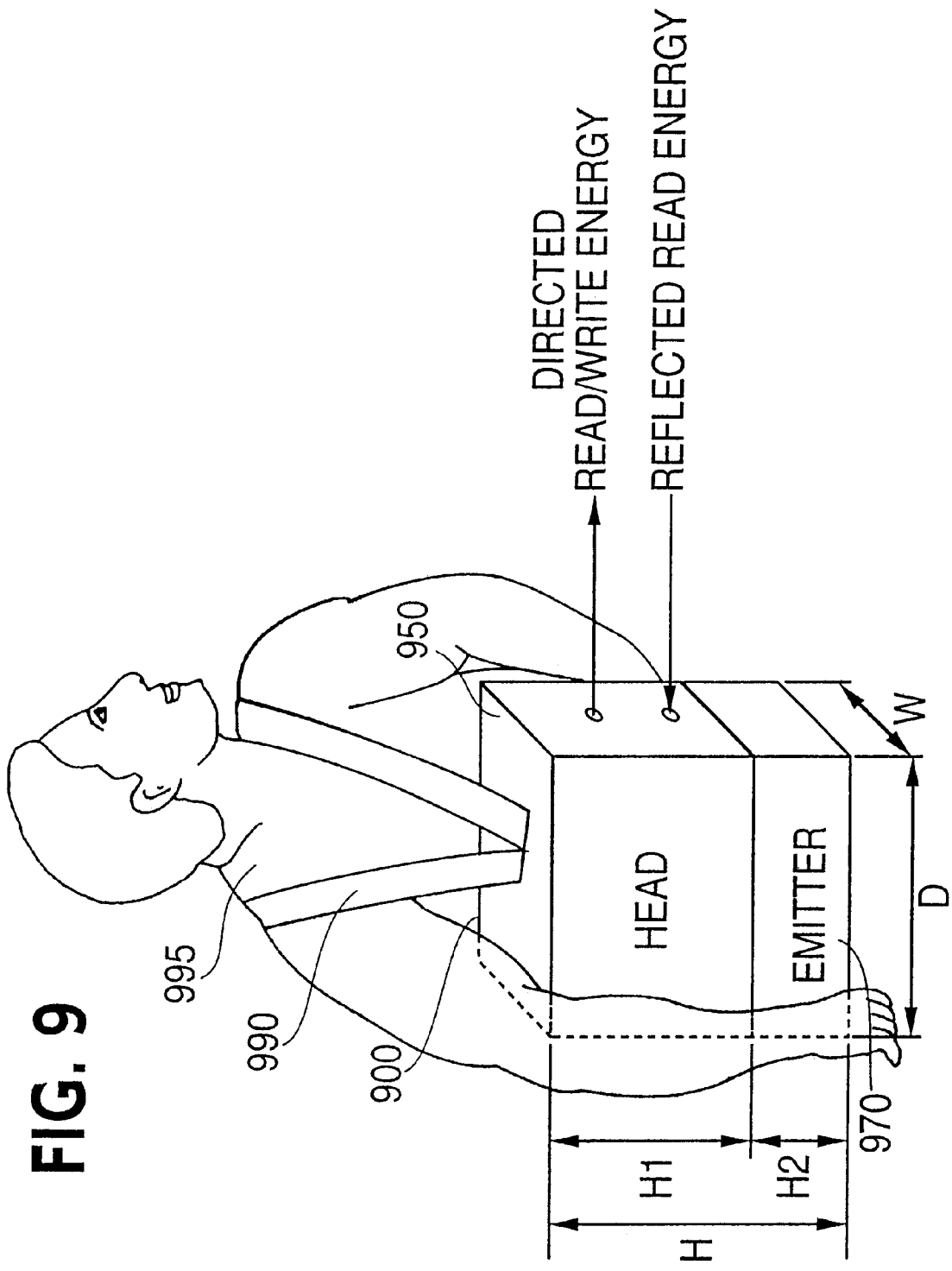
FIG. 9 depicts a portable read-write head and emitter assembly in accordance with the present invention.

FIG. 9 depicts a portable read-write head and emitter assembly 900. The assembly 900 includes a head housing 950 and an attached emitter housing 970. The emitter 970 is preferably attached to the head 950 so as to be removable, thereby allowing other emitters (not shown) to be attached to the head in lieu of emitter 970, as may be desirable under the circumstances. The head portion 950 could, if desired, function in a manner substantially similar to head 450', described above with reference to FIG. 6. The emitter portion 970 could, if desired, function in a manner substantially similar to emitter 470', which is also described above with reference to FIG. 6.

As shown, the portable assembly 900 is easily carried from location to location by an operator 995. A shoulder strap 990 is preferably attached to the outside of the housing of the head 950 so that the primary weight of the assembly 900 is supported by the operator's shoulder during movement and, if desired, operation.

Advantageously, the assembly 900 has an overall height H ranging from 4 to 40 inches. The head portion 950 has a height H1 ranging from 2 to 20 inches, and the emitter portion 970 has a height H2 ranging from 2 to 20 inches. The width W of the assembly 900 ranges from 2 to 20 inches. The depth D of the assembly 900 is in the range of 2 to 20 inches. The weight of the assembly is in the range of 2 to 20 pounds.

It should be understood that the dimensional and weight ranges set forth above are approximate. The dimensional ranges reflect the outer dimensions of the highest, widest and deepest sections of the assembly. Although the head portion 950 and emitter portion 970 are each shown to be housed in a cube shaped housing, this is not mandatory. Further, although certain dimensions of the head portion 950 and emitter portion 970 are shown in FIG. 9 to be the same, this also is not mandatory.

The assembly 900 is capable of operating in multiple modes. In at least one mode, the assembly operates to emit energy and detect the reflection of such emitted energy off a target to read data or information. It should be understood that the read data or information could be of virtually any type. In at least one other mode, the assembly operates to emit energy, which may have the same or a different energy level as the energy emitted in other mode(s), to write data or information on a target. This later target could be the same or a different target from the read target.

Thus, to use the portable read-write assembly 900, the operator 995 uses strap 990 to move the assembly 900 to a desired location from which the read and/or write target(s) can be viewed by the head. Using, for example, a personal computing device (PCD) (not shown) or other user input device, the operator may enter user commands as appropriate. These commands are communicated to the head portion 950 via an interface as previously discussed, to initiate operation of the assembly in the proper mode. If desired, the PCD or other input device could be integrated into the housing of the head portion 950 or a holder for a convention PCD or other input device could be provided on the outside of the housing of the head portion 950.

If desired, the head 950 may be configured to respond to user commands directing the assembly to begin a read job, a write job or a read-write job. Because of the portable nature of the assembly 900, the operator can, if desired, temporarily place the assembly 900 on a support during operation. Alternatively, the operator may continue to support the assembly 900 during operations as shown in FIG. 9.

Figure 10:
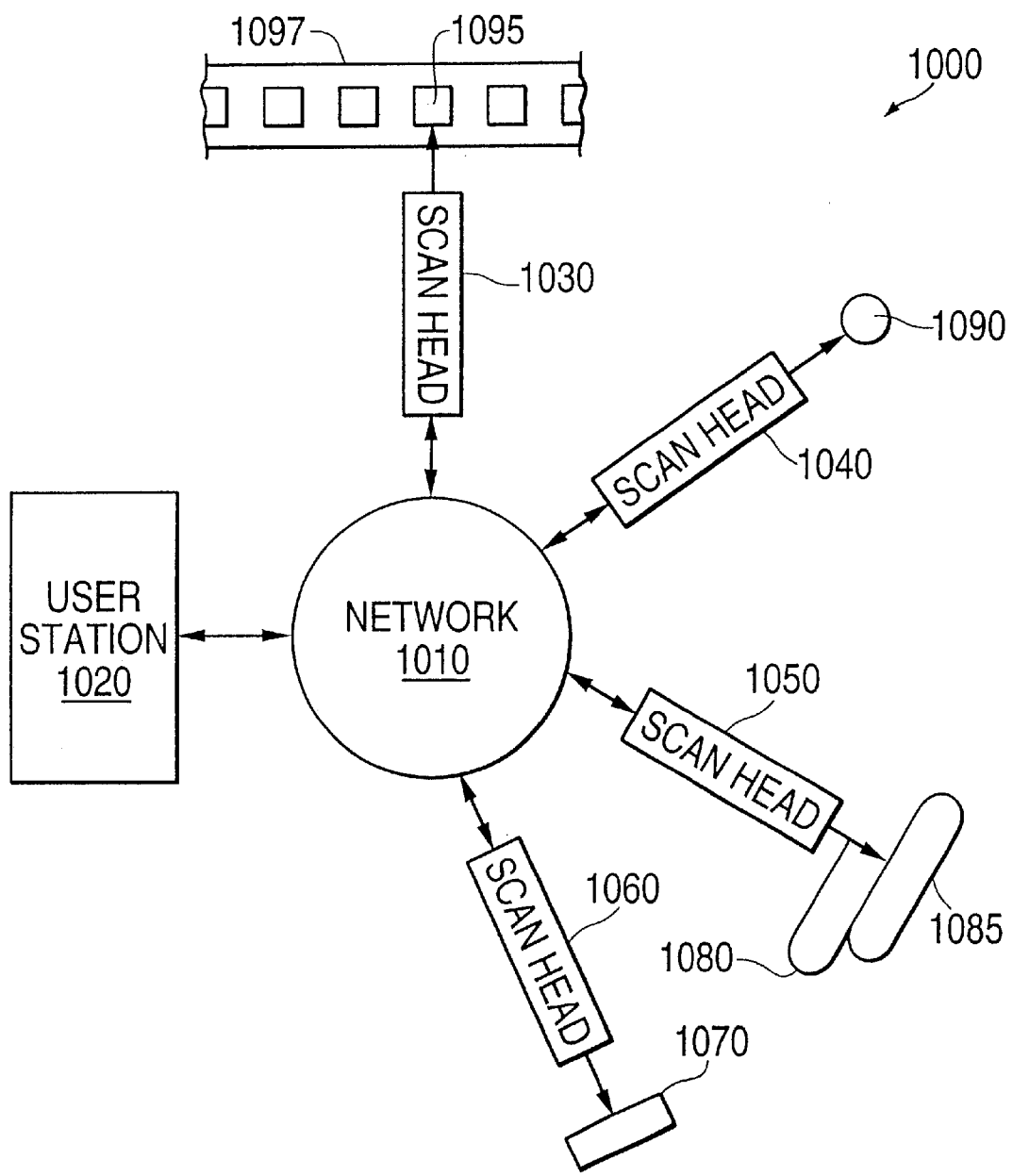
FIG. 10 depicts a first networked energy scanning system in accordance with the present invention.

FIG. 10 depicts an exemplary networked scanning system 1000. The system includes a communications network 1010, which could be a wide area network, such as the Internet, a local area network, such as an Ethernet, or any other type communications network. A user station 1020 is interconnected to the network 1010. It should be understood that, although not shown, the system 1000 could include multiple user stations interconnected to network 1010. Also connected to network 1010 are multiple scan heads 1030–1060. All of the scan heads 1030–1060 may be identical, or some or all of the scan heads could be different. However, each of the depicted scan heads 1030–1060 corresponds to one of the scan heads described above.

In operation, a user operating the user station 1010 can transmit commands, such as instructions to initiate a job, to the applicable scan head via the network 1010. Responsive to receipt of the transmitted commands, the applicable scan head issues appropriate commands to direct energy, such as a laser light beam, at a target to perform the necessary operations and thereby fulfill the job requirements.

As shown, scan head 1030 directs a write beam to mark a date on products 1095 as they are moved along an assembly line by a conveyor 1097, in accordance with the job instructions received from the user station 1020. Scan head 1040 directs a write beam to cut a stationary product 1090, in accordance with the job instructions received by scan head 1040 from the user station 1020. Scan head 1050 directs a write beam to weld stationary product parts 1080 and 1085, in accordance with the job instructions it receives from the user station 1020. Finally, scan head 1060 directs a write beam to remove a mark from stationary product 1070, in accordance with the job instruction received from the user station 1020.

If data or information is gathered at the scan head as, for example, has been previously described in connection with certain implementations of the invention, the gathered information can, if desired, be transmitted back from the applicable scan head to the user station 1020 via the network 1010. Further, information regarding the internal operations of each scan head itself can also be transmitted back to the user station 1020 via the network 1010, if such feedback is desired.

Figure 11:
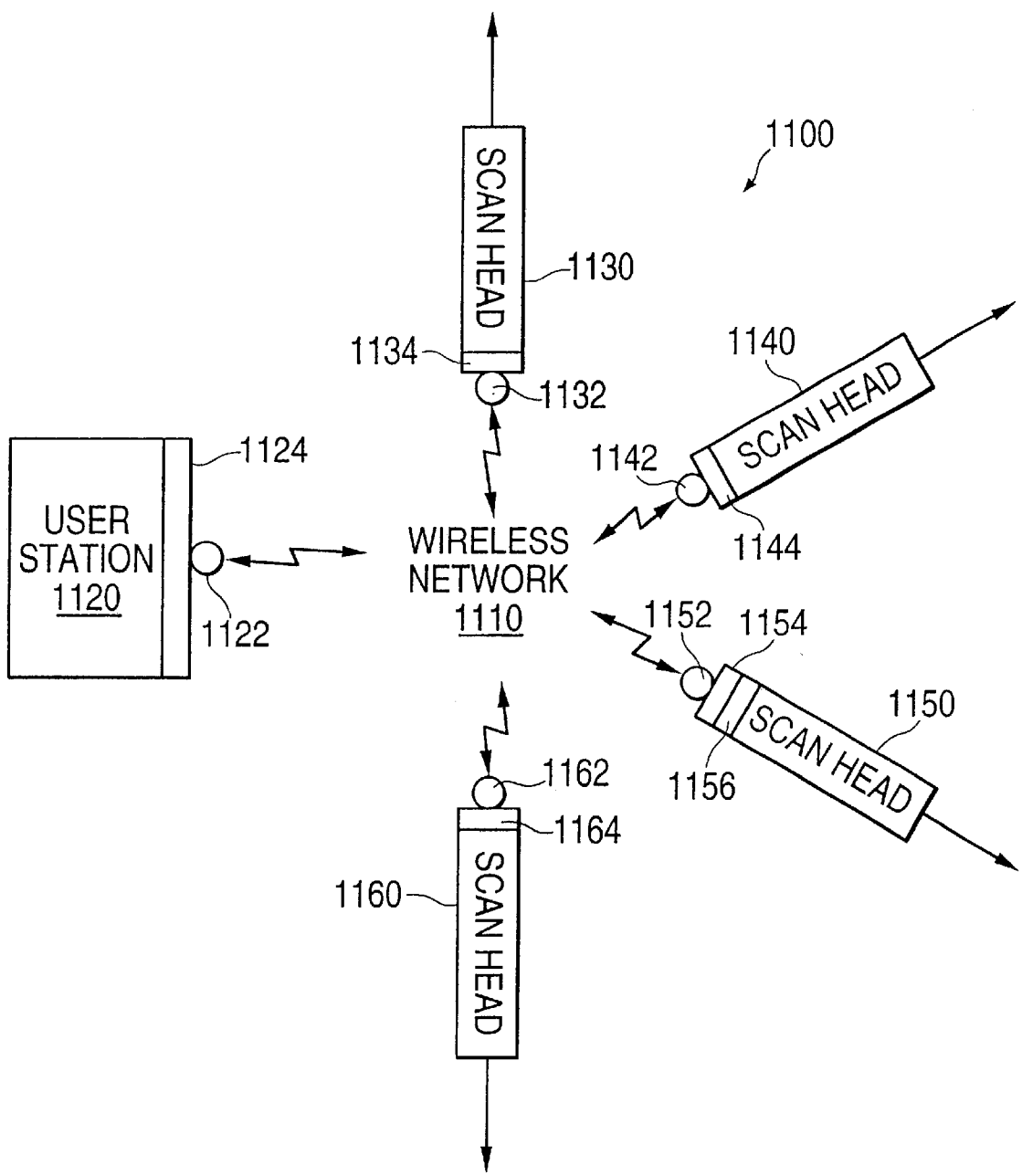
FIG. 11 depicts a second networked energy scanning system in accordance with the present invention.

FIG. 11 depicts a networked system 1100 which is similar to the system shown in FIG. 10 but in which the communications network 1110 is a wireless communications network. The network 1110 could be a radio frequency, microwave, infra-red, cellular, spread spectrum or other type wireless communications network.

As shown in FIG. 11, the user station 1120 and scan heads 1130–1160 are similar to the user station 1020 and scan heads 1030–1060 shown in FIG. 10, except that each of these devices is equipped for wireless communications. More particularly, the above described user station and scan heads are each adapted for wireless communications by incorporating an antenna and transmit and/or receive components necessary for communicating over wireless network 1110. One or more of the depicted scan heads could be a portable scan head of the type described in FIG. 9. The incorporation of an antenna and other components in the above described scan heads is easily accomplished using techniques that are well understood by those skilled.

Accordingly, as shown in FIG. 11, the user station 1120 includes an antenna 1122 and a transceiver 1124. The antenna and transceiver allow the station 1120 to both transmit and receive communications via wireless network 1110. Scan heads 1130 and 1160 each include an antenna 1132 or 1162 and a transceiver 1134 or 1164. Therefore, these scan heads are capable of not only receiving communications from the user station 1120, but also transmitting communications to the user station. Scan head 1140 includes an antenna 1142 and a receiver 1144. Hence, scan head 1140 is only configured to receive communications, such as commands from the user station 1120 to initiate a job, via the wireless network 1110. Scan head 1150 includes an antenna 1152 and a receiver 1154 and separate transmitter 1156. Thus, scan head 1150 is also capable of receiving and transmitting communications via the network 1110.

It will of course be understood that features of networks 1010 and 1110 could be combined into a hybrid network with some communication links being wired, others being wireless and still others being only partially wired. In such a hybrid network, some of the scan heads and perhaps some of multiple user stations could interconnect with the hybrid network via a hard wired interconnection, while other of the scan heads and multiple user stations might be interconnected to the hybrid network via a wireless interconnection.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

We claim:

1. A system for directing energy, comprising:
   a housing;
   an input interface port configured to receive an input at the housing;

a controller, disposed within the housing, configured to issue command control signals including trajectory control signals corresponding to the received input;

a scanner, disposed within the housing, configured to direct energy; and a non-interruptible interface having a bandwidth of not less than 20 KHz and a latency of not more than 5 milliseconds, disposed within the housing and configured to communicate the issued trajectory control signals from the controller to the scanner;

wherein the scanner is further configured to direct continuous movement of the energy, in two directions simultaneously, in accordance with the communicated trajectory control signals.

2. The system of claim 1, wherein:

the input received by the interface port is interruptible.

3. The system of claim 1, wherein the controller is further configured such that the issued command control signals also include emitter control signals corresponding to the received input, and further comprising:

an emitter configured to emit energy; and an emitter interface, configured to communicate the issued emitter control signals from the controller to the emitter;

wherein the emitter is further configured to emit the energy in accordance with the communicated emitter control signals, and the energy directed by the scanner is the emitted energy.

4. The system of claim 3, wherein:

the emitter includes a laser light source; and the scanner includes a deflector configured to direct the emitted energy from the laser light source in accordance with the communicated trajectory control signals.

5. The system of claim 4, wherein:

the scanner further includes a servo and a galvo;

the non-interruptible interface interconnects the controller to the servo;

the servo is configured to generate drive signals in accordance with the communicated trajectory control signals; and the galvo is configured to move the deflector in accordance with the generated drive signals to direct the emitted energy.

6. The system of claim 1, further comprising:

a memory, disposed within the housing, configured to store a trajectory control algorithm;

wherein the controller is further configured to generate the command control signals corresponding to the received input based on the stored trajectory control algorithm and to issue the generated command control signals.

7. The system of claim 1, further comprising:

a memory, disposed within the housing, configured to store the command control signals;

wherein the issued command control signals are the stored command control signals retrieved from the memory, and the controller is further configured to issue the retrieved command control signals responsive to the receipt of another input.

8. The system of claim 7, wherein the controller is further configured to:

generate and store the command control signals corresponding to the received input responsive to receipt of the input; and retrieve the stored command control signals and issue the retrieved command control signals responsive to the receipt of the other input.

9. The system of claim 1, wherein the input corresponds to one of a user command and a sensed parameter.

10. The system of claim 1, wherein:

the input corresponds to one of a user command and data representing a sensed parameter generated external to the housing;

the controller is further configured to generate the command control signals based on the input; and the time lapse between receipt of the input at the housing and the scanner directing the emitted energy in accordance with the communicated trajectory control signals is less than one millisecond.

11. The system of claim 1, further comprising:

a sensor, disposed within the housing, configured to detect a parameter and generate a sensor signal corresponding to the detected parameter; and a sensor interface, disposed within the housing, configured to interconnect the sensor and the controller and to communicate the generated sensor signal from the sensor to the controller;

wherein the controller is further configured to issue other command control signals, including other trajectory control signals, corresponding to the communicated sensor signal;

wherein the non-interruptible interface is further configured to communicate the issued other trajectory control signals from the controller to the scanner;

wherein the scanner is further configured to direct the energy in accordance with the communicated other trajectory control signals.

12. The system of claim 11, wherein the command control signals issued by the controller include emitter control signals corresponding to the received input and the other command control signals issued by the controller also include other emitter control signals corresponding to the communicated sensor signal, and further comprising:

an emitter configured to emit energy; and an emitter interface configured to communicate the issued emitter control signals and the issued other emitter control signals from the controller to the emitter;

wherein the emitter is further configured to emit the energy in accordance with the communicated emitter control signals and the communicated other emitter control signals.

13. The system of claim 1, further comprising:

an input device configured to interconnect to the input interface port and transmit the input via the input interface port, and to be disconnected from the input interface port.

14. A multi-mode energy emitting system, comprising:

a housing;

a controller, disposed within the housing, configured to issue first command control signals in a first mode operation based on a first input and to issue second command control signals in a second mode of operation based on a second input;

an emitter configured to emit energy having a first power responsive to the first command control signals and to emit energy having a second power, different than the first power, responsive to the second command control signals; and a scanner, disposed within the housing, configured to direct the emitted energy having the first power responsive to the communicated first command control signals and the emitted energy having the second power responsive to the communicated second command control signals.

15. The system of claim 14, wherein the scanner further includes a servo, a galvo and a deflector, and further comprising:

a non-interruptible interface, disposed within the housing, configured to communicate the first and the second command control signals from the controller to the servo;

wherein the servo is configured to generate first drive signals in accordance with the communicated first command control signals and to generate second drive signals in accordance with the communicated second command control signals;

wherein the galvo is configured to position the deflector in a first position in accordance with the generated first drive signals and to position the deflector in a second position in accordance with the generated second drive signals.

16. The system of claim 14, wherein the first input corresponds to one of a first user command, a first sensed parameter, and a first clock signal, and the second input corresponds to one of a second user command, a second sensed parameter, and a second clock signal.

17. The system of claim 14, wherein:

the housing is a portable housing; and the emitter is disposed within the portable housing.

18. The system of claim 17, further comprising:

a carrier attached to the portable housing and usable by a single human being to lift the housing, with the controller, emitter and scanner disposed therein, and move the lifted housing to a desired location.

19. A method of operating an optical scan head, comprising:

receiving an input at the scan head;

generating, at the scan head, command control signals, including trajectory control signals having a bandwidth of at least 20 KHz, corresponding to the received input;

transmitting the generated command control signals with a maximum latency of 5 milliseconds; and directing energy in accordance with the transmitted trajectory control signals.

20. The method according to claim 19, wherein the received input is interruptible during reception.

21. The method of claim 19, wherein the generated command control signals also include emitter control signals, and further comprising:

emitting the energy in accordance with the transmitted emitter control signals;

wherein the directed energy is the emitted energy.

22. The method of claim 19, further comprising:

storing a trajectory control algorithm at the scan head;

wherein the trajectory control signals are generated in accordance with the stored trajectory control algorithm.

23. The method of claim 19, wherein:

the received input corresponds to one of a user command and data representing a sensed parameter; and the time lapse between the receipt of the input and the directing of the energy in accordance with the transmitted trajectory control signals is less than one millisecond.

24. The method of claim 19, further comprising:

sensing a parameter at the scan head;

generating other command control signals, including other trajectory control signals, corresponding to the sensed parameter;

directing the energy in accordance with the generated other trajectory control signals.

25. A method of operating a scan head in multiple modes, comprising:

in a first operational mode, generating first command control signals at the scan head;

in a second operational mode, generating second command control signals at the scan head;

directing energy having a first power, responsive to the first command control signals; and directing energy having a second power, different than the first power, responsive to the second command control signals;

wherein the first command control signals and the second command control signals are high bandwidth signals;

wherein the directed energy having the first power is a write beam and the directed energy having the second power is a read beam.

26. A system for emitting energy, comprising:

a housing;

a wireless input interface port configured to receive an input at the housing;

a controller, disposed within the housing, configured to generate emitter control signals corresponding to the received input and to issue trajectory control signals corresponding to the received input;

an emitter configured to emit energy in accordance with the generated emitter control signals;

a scanner, disposed within the housing, configured to direct the emitted energy; and a non-interruptible interface, disposed within the housing, configured to communicate the issued trajectory control signals from the controller to the scanner, and having a bandwidth of not less than 20 KHz and a latency of not more than 5 milliseconds;

wherein the input received by the interface port is interruptible;

wherein the scanner is further configured to direct continuous movement of the emitted energy, in two directions simultaneously, in accordance with the communicated trajectory control signals.

27. A method of operating an optical scan head, comprising:

receiving, at the scan head, an input corresponding to one of a user command and data representing a sensed parameter;

generating, at the scan head, command control signals, including trajectory control signals, corresponding to the received input;

transmitting the generated command control signals; and directing energy in accordance with the transmitted trajectory control signals;

wherein the time lapse between the receipt of the input and the directing of the energy in accordance with the transmitted trajectory control signals is less than one millisecond.

* * * * *